March 11, 1924.
L. DOBAY
COMBINATION STOVE AND REFRIGERATOR
Filed July 6, 1923
1,486,642
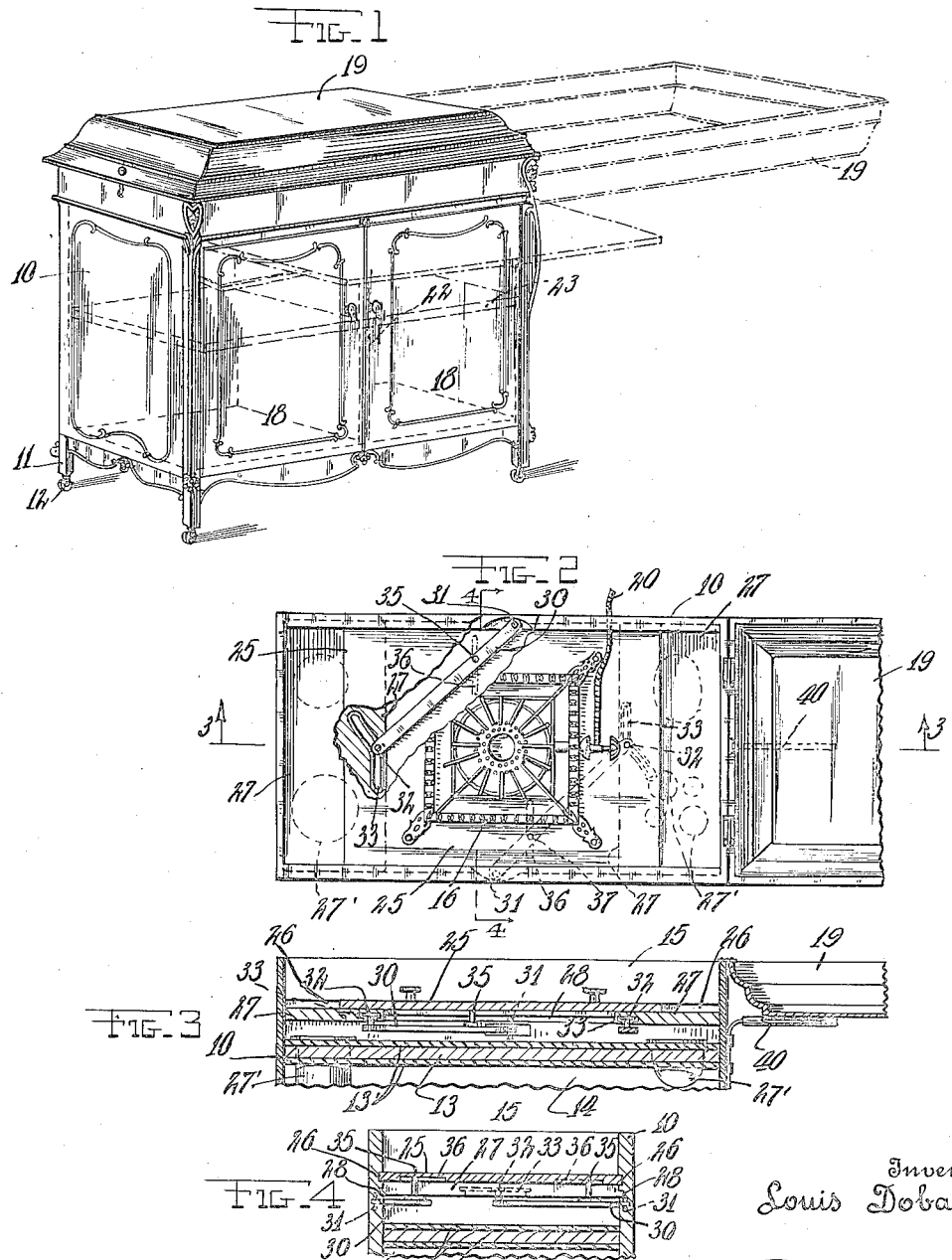
Inventor
Louis Dobay Patented Mar. 11, 1924.

1,486,642

UNITED STATES PATENT OFFICE.

LOUIS DOBAY, OF BENWOOD, WEST VIRGINIA.

COMBINATION STOVE AND REFRIGERATOR.

Application filed July 6, 1923. Serial No. 649,894.

*To all whom it may concern:*

Be it known that I, LOUIS DOBAY, a citizen of Hungary, residing at Benwood, in the county of Marshall and State of West Virginia, have invented certain new and useful Improvements in Combination Stoves and Refrigerators, of which the following is a specification.

This invention relates generally to devices used in housekeeping, having more particular reference to a combination device for use in what is generally known as light housekeeping, where compactness and economy of space are desired.

The invention has for an object the provision of a novel combination device comprising in a single unit a gas stove and a refrigerator, the refrigerator being suitably insulated from the stove to prevent the passage of heat.

For further comprehension of the invention, and of the objects and advantages thereof, reference will be had to the following description and accompanying drawings and to the appended claims in which the various novel features of the invention are more particularly set forth.

Fig. 1 of the drawing is a perspective view showing my improved combination device.

Fig. 2 is a plan view with the cover thrown back, certain parts being shown in horizontal section.

Fig. 3 is a fragmentary longitudinal sectional view taken on the line 3—3 of Fig. 2.

Fig. 4 is a fragmentary transverse sectional view taken on the line 4—4 of Fig. 2.

As here embodied my improved device comprises a rectangular casing 10 which may be supported on short legs 11 provided with caster rollers 12. This casing is provided with a horizontal partition 13 a short distance from the upper end thereof which divides it into a main lower compartment 14 forming the refrigerator or icebox, and a shallow upper compartment 15 in which is positioned a small single burner gas stove 16. The partition 13 may be faced on both sides with asbestos sheeting 13'. The compartment 14 is closed by a pair of hinged doors 18, and the compartment 15 is closed by a cover 19 hinged to one end of the top of the casing 10 and which, when in place, is suitably spaced from the top of the stove 16. The gas to the stove 16 may be supplied through a flexible tube 20 introduced through the side of the casing 10. The main compartment 14 may be subdivided by vertical and horizontal partitions 22 and 23 respectively as indicated.

The stove 16 is fixed on a board 25 which is spaced a slight distance above the partition 13 and is engaged at its sides in guide grooves such as indicated at 26 in the side walls of the casing so as to be capable of longitudinal adjustment in the said casing. At its ends this board projects over a pair of leaves 27 which extend from side to side of the casing and are engaged at their ends in other guide grooves such as 28 in the casing walls. Sunk through the partition near the ends thereof so as to be covered by the leaves 27 are receptacles such as 27' into which may be placed pots or the like containing cooked food that is desired to cool quickly.

When the stove is positioned centrally in the compartment 15 these leaves 27 are projected over the receptacles and contact with the end walls of said compartment, and when it is desired to have access to the receptacles at either end of the casing the stove 16 and with it the board 25 is moved toward the other end of the compartment, means being provided whereby this movement of the stove causes the desired leaf to have an increased movement imparted thereto so as to expose the receptacle. To this end a pair of horizontal lever bars 30 are mounted in the space under the board 25 and above the partition 13 being fulcrumed in suitable slots cut in the front and rear walls of the casing respectively, as indicated at 31.

These lever bars normally extend obliquely with respect to the board 25 and have pins 32 in their opposite ends which engage in grooves 33 in the undersides of the leaves 27. These grooves extend for approximately one-half their length parallel to the sides of the leaves, the other half being curved to be concentric to the lever fulcrums 31' when the leaves are in their normal position. A third pin 35 is fixed to each lever a relatively short distance from the first mentioned end thereof, these pins 35 engaging in short transverse slots 36 in the underside of the board 25.

Assuming the parts in the position shown in Fig. 2 of the drawing, if the board is moved in either direction, for instance toward the right, the lever under the rear side of the board 25 will be caused to swing in the same general direction as that of the board and will cause an increased movement to be imparted to the leaf at the rear side of the board which will cause said leaf to swing completely under the rear portion of the board and so expose the receptacles. During this movement the pin 32 on the free end of this bar rides along that part of the slot 33 which is parallel to the side of the leaf.

During this movement the other lever is swung, also toward the right, but the pin 32 on its free end rides freely in the curved portion of the slot 33. The parts are so arranged that when the board is centrally positioned in the compartment 15 the pins 32 are at the juncture of the straight and curved portions of the slots 33.

To support the cover 19 when opened an angular arm 40 may be hinged to the end wall of the casing.

Having thus described my invention what I claim as new and desire to protect by Letters Patent of the United States is as follows:

1. A device of the class described comprising a casing divided into upper and lower compartments by a partition, a board slidably supported in the upper compartment above said partition, a stove fixed on said board, leaves extending between the ends of said board and the end walls of the casing and normally covering openings in said partition, and means effecting an operative connection between said board and the said leaves whereby movement of the board in one direction moves a selected leaf to expose the opening under the latter, said means comprising a pair of levers fulcrumed to the casing wall and engaged both with said board and said leaves.

2. A device of the class described comprising a casing divided into upper and lower compartments by a partition, a board slidably supported in the upper compartment above said partition, a stove fixed on said board, leaves extending between the ends of said board and the end walls of the casing and normally covering openings in said partition, and means effecting an operative connection between said board and the said leaves whereby movement of the board in one direction moves a selected leaf to expose the opening under the latter, said means comprising a pair of levers fulcrumed to the casing wall at one end and engaged at their other ends with the said leaves and at points between their ends with the said board.

3. A device of the class described comprising a casing divided into upper and lower compartments by a partition, a board slidably supported in the upper compartment above said partition, a stove fixed on said board, leaves extending between the ends of said board and the end walls of the casing and normally covering openings in said partition, and means effecting an operative connection between said board and the said leaves whereby movement of the board in one direction moves a selected leaf to expose the opening under the latter, said means comprising a pair of levers fulcrumed at one end to the casing wall, said levers having pins fixed thereto at points between their ends engaging in transverse grooves in the said board, and having pins fixed to their free ends engaging in grooves in the said leaves.

4. A device of the class described comprising a casing divided into upper and lower compartments by a partition, a board slidably supported in the upper compartment above said partition, a stove fixed on said board, leaves extending between the ends of said board and the end walls of the casing and normally covering openings in said partition, and means effecting an operative connection between said board and the said leaves whereby movement of the board in one direction moves a selected leaf to expose the opening under the latter, said means comprising a pair of levers fulcrumed at one end to the casing wall, said levers having pins fixed thereto at points between their ends engaging in transverse grooves in the said board, and having pins fixed to their free ends engaging in grooves in the said leaves, said last named grooves extending partly parallel to the sides of the leaves and partly concentric to the fulcrum points of the levers.

In testimony whereof I have affixed my signature.

LOUIS DOBAY.